US012764067B2

(12) United States Patent
Mizrahi et al.

(10) Patent No.: US 12,764,067 B2
(45) Date of Patent: Oct. 13, 2026

(54) NETWORK LOOPBACK PACKET TEST REQUEST AND RESPONSE

(71) Applicant: HUAWEI TECHNOLOGIES CO., LTD., Shenzhen (CN)

(72) Inventors: Tal Mizrahi, Hod Hasharon (IL); Reuven Cohen, Hod Hasharon (IL); Ben-Shahar Belkar, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 18/990,868

(22) Filed: Dec. 20, 2024

(65) Prior Publication Data

US 2025/0126061 A1 Apr. 17, 2025

Related U.S. Application Data

(63) Continuation of application No. PCT/EP2022/067245, filed on Jun. 23, 2022.

(51) Int. Cl.
*H04L 69/327* (2022.01)
*H04L 45/74* (2022.01)
(Continued)

(52) U.S. Cl.
CPC ............ *H04L 45/74* (2013.01); *H04L 69/325* (2013.01); *H04L 69/326* (2013.01); *H04L 69/327* (2013.01)

(58) Field of Classification Search
CPC ..... H04L 45/74; H04L 69/325; H04L 69/326; H04L 69/327; H04L 69/161;
(Continued)

(56) References Cited

U.S. PATENT DOCUMENTS 7,336,620 B2 * 2/2008 Bennett ................. H04L 69/161 370/252
7,764,621 B1 * 7/2010 Busch ................... H04L 49/501 370/249
(Continued)

FOREIGN PATENT DOCUMENTS

CN 101682635 A * 3/2010 ............. H04L 69/32
EP 1289195 A1 * 3/2003 ........... H04L 12/437
(Continued)

OTHER PUBLICATIONS

Bonica et al., "Extended ICMP to Support Multi-Part Messages," Network Working Group, Request for Comments: 4884, Apr. 2007. (Year: 2007).*

(Continued)

*Primary Examiner* — Alina A Boutah
(74) *Attorney, Agent, or Firm* — Fish & Richardson P.C.

(57) ABSTRACT

The present disclosure provides example network devices and communication methods. One example method includes transmitting, by a first network device, according to a network protocol, a packet to a second network device. The packet includes loopback request information in a header of a layer of a network model. A loopback reply packet is received. The loopback reply packet includes, in a payload, at least a portion of the packet including at least one header of the packet. The loopback request information requests the second network device to transmit the loopback reply packet to the first network device.

20 Claims, 7 Drawing Sheets

(A)

(B)

(51) Int. Cl.
*H04L 69/325* (2022.01)
*H04L 69/326* (2022.01)

(58) Field of Classification Search
CPC ....... H04L 69/321; H04L 43/10; H04L 43/50; H04L 12/26; H04L 12/27; H04L 12/24; H04L 47/20; H04L 47/30; H04W 24/00; G06F 15/16
See application file for complete search history.

(56) References Cited

U.S. PATENT DOCUMENTS

| | | | | |
|---|---|---|---|---|
| 7,908,130 B2 * | 3/2011 | Van Ginkel | H04L 47/10 | 709/224 |
| 8,279,759 B1 * | 10/2012 | Jones | H04L 43/106 | 709/224 |
| 8,339,973 B1 * | 12/2012 | Pichumani | H04L 43/10 | 370/248 |
| 11,552,879 B1 * | 1/2023 | Sivabalan | H04L 45/123 | |
| 11,936,557 B2 * | 3/2024 | Mittal | H04L 45/50 | |
| 2003/0231632 A1 * | 12/2003 | Haeberlen | H04L 45/00 | 370/395.5 |
| 2004/0052263 A1 * | 3/2004 | Xu | H04L 12/2856 | 370/399 |
| 2004/0095930 A1 * | 5/2004 | Bennett | H04L 43/50 | 370/389 |
| 2006/0020861 A1 * | 1/2006 | Frodsham | G01R 31/31716 | 714/724 |
| 2008/0304486 A1 * | 12/2008 | Graessley | H04L 69/161 | 370/392 |
| 2015/0078174 A1 * | 3/2015 | Wallman | H04L 69/22 | 370/241.1 |
| 2016/0205008 A1 * | 7/2016 | Dasu | H04L 43/0888 | 709/224 |
| 2017/0019326 A1 * | 1/2017 | Patel | H04L 1/243 | |

FOREIGN PATENT DOCUMENTS

| | | | | |
|---|---|---|---|---|
| WO | 2013050823 A1 | 4/2013 | | |
| WO | WO-2018161794 A1 * | 9/2018 | H04L 49/30 | |

OTHER PUBLICATIONS

J. Postel, Network Working Group Request for Comments: 792, Internet Control Message Protocol DARPA Internet Program Protocol Specification, Sep. 1981. (Year: 1981).*

Kumar et al., "Inband Flow Analyzer draft-kumar-ippm-ifa-04," Network Working Group Internet-Draft , Jan. 20, 2022, 28 pages.

Gandhi et al., "Performance Measurement Using Simple TWAMP (STAMP) for Segment Routing Networks draft-ietf-spring-stamp-srpm-03," Spring Working Group Internet-Draft, Feb. 1, 2022, 24 pages.

Bhandari et al., "In-situ OAM IPv6 Options draft-ietf-ippm-ioam-ipv6-options-07," ippm, Internet-Draft, Feb. 6, 2022, 11 pages.

Conta et al., "Internet Control Message Protocol (ICMPv6) for the Internet Protocol Version 6 (IPv6) Specification," Network Working Group, Request for Comments: 4443, Mar. 2006, 24 pages.

Filsfils et al., "RFC 8754 IPV6 Segment Routing Header (SRH)," Internet Engineering Task Force (IETF), Mar. 2020, 27 pages.

Filsfils et al., "Path Tracing in SRv6 networks,draft-filsfils-spring-path-tracing-00," SPRING, Internet-Draft, Mar. 4, 2022, 13 pages.

Postel, "Internet Control Message Protocol, Darpa Internet Program Protocol Specification," Network Working Group, Request for Comments: 792, Sep. 1981, 21 pages.

Postel, "Internet Control, Darpa Internet Program Protocol Specification," RFC: 791, Sep. 1981, 51 pages.

Deering et al., "Internet Protocol, Version 6 (IPv6) Specification," Internet Engineering Task Force (IETF), Request for Comments: 8200, Jul. 2017, 42 pages.

Mirsky et al., "RFC 8972 Simple Two-Way Active Measurement Protocol Optional Extensions," Internet Engineering Task Force (IETF), Jan. 2021, 29 pages.

Ali et al., "Segment Routing Header encapsulation for In-situ OAM Data draft-ali-spring-ioam-srv6-05," SPRING Working Group, Internet-Draft, Jan. 12, 2022, 7 pages.

Mirsky et al., "RFC 8762 Simple Two-Way Active Measurement Protocol," Internet Engineering Task Force (IETF), Mar. 2020, 15 pages.

International Search Report and Written Opinion in International Appln. No. PCT/EP2022/067245, mailed on Feb. 1, 2023, 14 pages.

* cited by examiner (A)

(B)

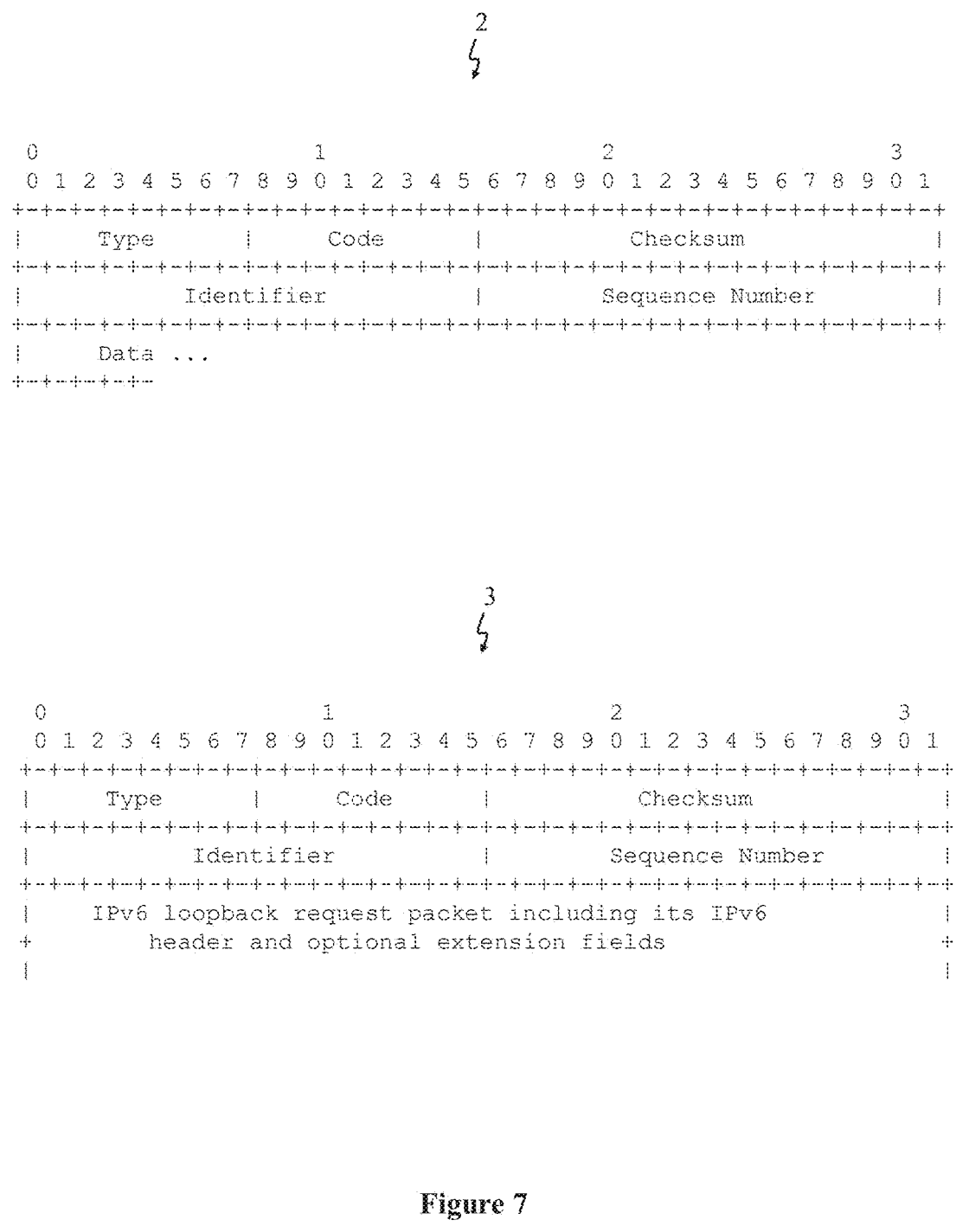

2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|           Identifier          |        Sequence Number        |
+-+-+-+-+-+-+-+-+-+-+-+-+-+-+-+-+-+-+-+-+-+-+-+-+-+-+-+-+-+-+-+-+
|     Data ...
+-+-+-+-+-
```

3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|           Identifier          |        Sequence Number        |
+-+-+-+-+-+-+-+-+-+-+-+-+-+-+-+-+-+-+-+-+-+-+-+-+-+-+-+-+-+-+-+-+
|    IPv6 loopback request packet including its IPv6            |
+        header and optional extension fields                   +
|                                                               |
```

Figure 7

NETWORK LOOPBACK PACKET TEST REQUEST AND RESPONSE

CROSS-REFERENCE TO RELATED APPLICATIONS

This application is a continuation of International Application No. PCT/EP2022/067245, filed on Jun. 23, 2022, the disclosure of which is hereby incorporated by reference in its entirety.

TECHNICAL FIELD

The present disclosure relates to network devices and methods.

BACKGROUND

The present disclosure is directed to a network comprising network devices that may communicate with each other. The network devices are network nodes of the network. The internet protocol (IP) is an example of a network protocol that may be used for communication between the network devices.

SUMMARY

Network layer protocols, IPv4 and IPv6, are examples of a network protocol that supports header extensions. Each of these two protocols may use a fixed size base header: a 20-octet long header in IPv4 and a 40-octet long header in IPv6. Each of these two protocols allows the base header to be followed by an optional extension. In IPv4 there may be no header options or alternatively one or more header options, and in IPv6 there may be no extension header or alternatively one or more extension headers.

Each IPv6 extension header may be comprised of one or more type-length-value (TLV) options. A router or host that receives a packet with an IPv6 header and one or more extension headers may skip the extension headers and ignore them. Skipping may be performed or made possible by iteratively following the "length" part of each TLV.

Extension headers may be included in a packet by a host that sends the IPv6 packet, i.e. by the source (may be referred to as source network device or source network node). These extension headers may be used or updated by intermediate network devices (i.e. routers). For example, routers may push path tracing information and/or performance-related information, so that the extension header includes per-hop information about the path and/or performance. Optionally, the segment routing header (SRH) may be used by routers for segment routing. Segment routing may mean that the source (source network device) instructs the routers (intermediate network devices) how to route the packet to the destination (destination network device). Routers may update the SRH. The terms "send" and "transmit" may be used as synonyms.

The internet control message protocol (ICMP) may be used for probing networks and for reporting errors. In the network layer model (transmission control protocol/internet protocol five layer network model, i.e. TCP/IP five layer network model), IPv4/IPv6 are part of the network layer (i.e. layer 3), while ICMP is an intermediate layer above layer 3 (i.e. an intermediate layer between layer 3 and layer 4), which is used for probing and troubleshooting layer 3. In this disclosure the term "transmission control protocol/internet protocol five layer network model" is abbreviated by the term "TCP/IP five layer network model". ICMP has two variants, wherein ICMP is used for IPv4 and ICMPv6 is used for IPv6.

Both ICMP variants may comprise the capability to send an echo request to a destination host (i.e. destination network device) and receive an echo reply. The destination (or responder) that receives the echo request may send an echo reply to the IP address from which the echo request was received. Many applications may make use of echo request/reply messages, such as the "ping" application that may be used to test reachability of a host.

A different protocol that may perform a procedure that is similar to the ICMP echo is the simple two-way active measurement protocol (STAMP). STAMP is a protocol that may be used for performance measurement between two network nodes (i.e. network devices), the session-sender and session-reflector. Performance measurement may be performed using STAMP test packets. The session-sender may send one or more STAMP session-sender packets, and the session-reflector may reply to each test packet by sending a session-reflector test packet back to the session-sender. STAMP test packets may be sent over the user datagram protocol (UDP), which may be used over IP (either IPv4 or IPv6). STAMP test packets may include no optional type-length-value (TLV) fields or alternatively one or more optional TLV fields. The TLV fields are defined in the STAMP specification as "optional extensions that use Type-Length-Value (TLV) encoding". Specifically, these TLVs extend the STAMP header, which is analogous to the way extension headers extend the IPv6 header.

While there are several protocols that use extension headers for probing and collecting per-hop (per-router) information, there is no generic or standard way of returning this information back to the sender (i.e. the source network device). Such protocols may update the IP extension headers of the IP packet, which finally reaches the IP destination (i.e. destination network device), but the information in the IP extension headers that was updated along the path (from the source to the destination) does not propagate back to the source, which is often the host that actually needs this information. For example, an application such as the "ping" application may find it useful for the source to receive the extension headers from the forward path back from the responder, and present it to the user along with other information that is presented when invoking the "ping" application.

In view of the above, this disclosure aims to provide network devices and methods that allow returning of information to a source network device, when the source network device transmits according to a network protocol a packet to a destination network device. An objective of this disclosure may be to provide network devices and methods that allow returning information to a source network device in a generic or standard way.

These and other objectives are achieved by the solution of this disclosure as described in the independent claims. Advantageous implementations are further defined in the dependent claims.

A first aspect of this disclosure provides a network device. The network device is configured to transmit, according to a network protocol, a packet to a further network device, and receive a loopback reply packet comprising, in a payload, at least a portion of the packet including at least one header of the packet. The packet comprises loopback request information in a header of a layer of a network model. The loopback request information requests the further network device to transmit the loopback reply packet to the network device.

In other words, the first aspect proposes a generic way for returning information of a packet (such as network layer extension field information), which is sent from a source network device (i.e. the network device of the first aspect) to a destination network device (i.e. the further network device), back to the source network device, wherein the generic way is agnostic to the format of the information of the packet (e.g. the extension field format). The term "independent" may be used as a synonym for the term "agnostic".

The term "feedback" may be used as a synonym for the term "loopback". Therefore, for example, the term "feedback request information" may be used as a synonym for the term "loopback request information". The network protocol may be the internet protocol (IP). For example, the network protocol may be IPv4 or IPv6. The network device may be configured to transmit, according to the network protocol, the packet to the further network device via one or more intermediate network devices. The one or more intermediate network devices may be one or more routers. The loopback request information is or comprises a loopback request.

The network device may be referred to as a source or source network device with regard to transmitting the packet. The further network device may be referred to as a destination or destination network device with regard to transmitting the packet. The network device and the further network device may be referred to as network nodes. The term "part" may be used as a synonym for the term "portion". The network device may be configured to generate the packet (to be transmitted to the further network device).

The network device may communicate, according to the network protocol, with the further network device. For example, the network device may transmit, according to the network protocol, the packet to the further network device. The network device may receive, according to the network protocol, the loopback reply packet. The network device may receive the loopback reply packet from the further network device.

The network device may be implemented by software and/or hardware. The further network device may be implemented by software and/or hardware. The network device may comprise means for communication (e.g. transmitting the packet and receiving the loopback reply packet). The means for communication may comprise one or more antennas.

The further network device may be the network device according to the second aspect of this disclosure. The network device according to the first aspect of this disclosure may be or may be part of a server, network interface card (NIC), switch (network switch), router etc.

In an implementation form of the first aspect, the packet comprises one or more extension fields in a header of layer 3 of the network model.

The header of layer 3 of the network model may comprise the IP header (e.g. IPv4 header or IPv6 header) and optionally one or more extension fields (e.g. one or more IPv4 extension options or one or more IPv6 extension headers). The layer 3 of the network model may be the layer 3 of the TCP/IP five layer network model. The header of layer 3 may be referred to as "layer 3 header".

In case of IPv4, the one or more extension fields of the layer 3 header may be referred to as "one or more extension options". In the case of IPv6, the one or more extension fields may be referred to as "one or more extension headers". The one or more extension fields may be updatable by one or more intermediate network devices that may be present in the flow from the network device being the source to the further network device being the destination. The update, by the one or more intermediate network devices, of the optional one or more extension fields in the header of layer 3 may comprise information on at least one of the following: the respective intermediate device's state and/or performance (e.g. timestamps or counters); identity of the respective intermediate network device; and routing decision of the respective intermediate network device.

In an implementation form of the first aspect, the header of the layer of the network model, in which the packet comprises the loopback request information, is a header of an intermediate layer between layer 3 and layer 4 of the network model. The header of the intermediate layer may be referred to as "intermediate layer header".

The intermediate layer between layer 3 and layer 4 of the network model may be an intermediate layer between the layer 3 and layer 4 of the TCP/IP five layer network model. That is, the intermediate layer may be an intermediate layer of the TCP/IP five layer network model. If the network protocol is IPv4, the intermediate layer may be ICMP. If the network protocol is IPv6, the intermediate layer may be ICMPv6. The packet may be referred to as "loopback request packet".

In an implementation form of the first aspect, the loopback request information is or comprises one or more values of a type field of the header of the intermediate layer, the one or more values indicating a loopback request.

The type field may be the type field of an ICMP header or ICMPv6 header. A code field of the header of the intermediate layer may be constant and unused. The code field may be the code field of an ICMP header or ICMPv6 header.

In an implementation form of the first aspect, the network device is configured to incorporate an identification field and/or a sequence number field in the header of the intermediate layer.

In an implementation form of the first aspect, the network device is configured to assign a different identification field to each flow.

For example, a flow may be defined as a pair of a source and destination (e.g. {source address, destination address} pair) of communication, i.e. as a pair of a source network device and a destination network device. For this, the address of the source and the destination may optionally be used. For example, the network device transmitting the packet is the source and the further network device to which the packet is to be transmitted is the destination.

For example, a flow may be defined as a tuple of a source, destination and segment routing (SR) policy (e.g. {source address, destination address, SR policy} tuple). For this, the address of the source, the address of the destination and a SR policy may be used. The SR policy may explicitly define a path from the source to the destination, and use a segment routing header (SRH) to route through this path. The path may be via one or more intermediate network devices (e.g. routers).

In an implementation form of the first aspect, the network device is configured to use the identification field and/or sequence number field to keep track of loopback requests that have been replied and/or loopback requests that need to be retransmitted.

In an implementation form of the first aspect, the header of the layer of the network model, in which the packet comprises the loopback request information, is a header of layer 3 of the network model.

In other words, the packet may be a data packet and the network device may be configured to piggyback the loopback request information onto the data packet. The layer 3 of the network model may be the layer 3 of the TCP/IP five layer network model. The header of layer 3 may be referred to as "layer 3 header". The header of layer 3 may comprise the IP header (e.g. IPv4 header or IPv6 header) and optionally one or more extension fields (e.g. one or more IPv4 extension options or one or more IPv6 extension headers). The loopback request information may be in the IP header. In addition, or alternatively, the loopback request information may be in or may be at least one of the optional one or more extension fields of the header of layer 3.

In an implementation form of the first aspect, the loopback request information is or comprises an indication with regard to a loopback request.

Optionally, the indication may be one field of fields of the IP header. For example, a reserved value (or a range of reserved values) in the differentiated services code point (DSCP) field of the IP header may indicate that the packet is subject to a loopback request.

In an implementation form of the first aspect, the header of the layer of the network model, in which the packet comprises the loopback request information, is a header of layer 5 of the network model.

The layer 5 of the network model may be the layer 5 of the TCP/IP five layer network model. The header of layer 5 may be referred to as "layer 5 header".

In an implementation form of the first aspect, the loopback request information is or resides in a type-length-value (TLV) field.

The header of layer 5 may be a simple two-way active measurement protocol (STAMP) header. The TLV may be a STAMP header extension.

In an implementation form of the first aspect, the network device is configured to obtain information from the payload of the loopback reply packet.

In order to achieve the network device according to the first aspect of this disclosure, some or all of the implementation forms and optional features of the first aspect, as described above, may be combined with each other.

A second aspect of this disclosure provides a network device. The network device is configured to receive, according to a network protocol, a packet from a further network device, and transmit, in response to the received packet comprising loopback request information in a header of a layer of a network model, a loopback reply packet to the further network device. The loopback reply packet comprises, in a payload, at least a portion of the received packet including at least one header of the received packet.

Since the network device may return at least a portion of the received packet including at least one header of the received packet (e.g. extension information of the packet) without awareness of the format of the received packet (e.g. an extension format), the network device provides a generic way of returning information of the received packet that is agnostic to the format of the packet (e.g. agnostic with regard to an extension field format). The portion of the received packet comprised by the loopback reply packet may comprise path-based information, e.g. comprising performance and/or route information.

The above description with regard to the network device of the first aspect may be correspondingly valid for the network device of the second aspect. The network protocol may be the internet protocol (IP). For example, the network protocol may be IPv4 or IPv6. The network device may be configured to receive, according to the network protocol, the packet from the further network device via one or more intermediate network devices. The one or more intermediate network devices may be one or more routers. The further network device may be referred to as a source or source network device with regard to transmitting the packet to the network device. The network device may be referred to as a destination or destination network device with regard to transmitting the packet to the network device. The network device and the further network device may be referred to as network nodes. The network device may be configured to generate the loopback reply packet (to be transmitted to the further network device).

The network device may communicate, according to the network protocol, with the further network device. For example, the network device may receive, according to the network protocol, the packet from the further network device. The network device may transmit, according to the network protocol, the loopback reply packet to the further network device.

The network device may be implemented by software and/or hardware. The further network device may be implemented by software and/or hardware. The network device may comprise means for communication (e.g. receiving the packet and transmitting the loopback reply packet). The means for communication may comprise one or more antennas.

The network device according to the second aspect of this disclosure may be or may be part of a server, network interface card (NIC), switch (network switch), router etc.

The further network device (from which the network device of the second aspect may receive the packet) may be the network device according to the first aspect of this disclosure.

In an implementation form of the second aspect, the loopback reply packet comprises, in the payload, the entire received packet or a portion of the received packet including the at least one header of the received packet.

In other words, the loopback reply packet may comprise, in the payload, the entire received packet including all its headers or a truncated version of the received packet including the at least one header of the received packet.

In an implementation form of the second aspect, the loopback reply packet comprises, in the payload, a header of layer 3 of the network model of the received packet as the at least one header of the received packet.

The layer 3 of the network model may be the layer 3 of the TCP/IP five layer network model. The header of layer 3 may be referred to as "layer 3 header".

In an implementation form of the second aspect, in case the received packet comprises the loopback request information in a header of an intermediate layer between layer 3 and layer 4 of the network model, the loopback reply packet comprises, in the payload, the header of the intermediate layer of the received packet as the at least one header of the received packet and/or a payload of the intermediate layer of the received packet.

The intermediate layer between layer 3 and layer 4 of the network model may be an intermediate layer between the layer 3 and layer 4 of the TCP/IP five layer network model. That is, the intermediate layer may be an intermediate layer of the TCP/IP five layer network model. If the network protocol is IPv4, the intermediate layer may be ICMP. If the network protocol is IPv6, the intermediate layer may be ICMPv6.

In an implementation form of the second aspect, in case the received packet comprises the loopback request information in a header of layer 3 of the network model, the loopback reply packet comprises, in the payload, a payload of layer 4 of the network model of the received packet.

The layer 4 of the network model may be the layer 4 of the TCP/IP five layer network model. The payload of layer 4 of the network model may be an IPv4 payload or an IPv6 payload. The payload of layer 4 of the network model may comprise a transmission control protocol (TCP) header and TCP payload.

Optionally, in case the received packet comprises the loopback request information in a header of layer 3 of the network model, the loopback reply packet may comprise, in the payload, a header and payload of layer 4 of the network model of the received packet.

The header and payload of layer 4 of the network model may be an IPv4 header and IPV4 payload or an IPv6 header and IPv6 payload.

In an implementation form of the second aspect, in case the received packet comprises the loopback request information in a header of layer 5 of the network model, the loopback reply packet comprises, in the payload, the header of layer 5 of the network model of the received packet as the at least one header of the received packet.

The layer 5 of the network model may be the layer 5 of the TCP/IP five layer network model. The header of layer 5 may be referred to as "layer 5 header".

Optionally, in case the received packet comprises the loopback request information in a header of layer 5 of the network model, the loopback reply packet may comprise, in the payload, in addition to the header of layer 5 of the received packet at least one of a header of layer 3, a payload of layer 3, a header of layer 4, a payload of layer 4 and a payload of layer 5 of the received packet. For example, in case the received packet comprises the loopback request information in a header of layer 5 of the network model, the loopback reply packet may comprise, in the payload, headers and payloads of layers 3, 4 and 5 of the network model of the received packet.

In an implementation form of the second aspect, the loopback reply packet comprises a loopback reply indication in a header of an intermediate layer between layer 3 and layer 4 of the network model.

In an implementation form of the second aspect, in case a header of layer 3 of the network model of the received packet comprises one or more extension fields, the network device may be configured to skip at least one of the one or more extension fields when parsing the received packet.

The description with respect to the network device according to the first aspect of this disclosure may be correspondingly valid for the network device according to the second aspect of this disclosure. Optionally, the network device according to the second aspect of this disclosure is the network device according to the first aspect of this disclosure. The description with respect to the network device according to the second aspect of this disclosure may be correspondingly valid for the network device according to the first aspect of this disclosure.

The network device of the second aspect and its implementation forms and optional features achieve the same advantages as the network device of the first aspect and its respective implementation forms and respective optional features.

In order to achieve the network device according to the second aspect of this disclosure, some or all of the implementation forms and optional features of the second aspect, as described above, may be combined with each other.

A third aspect of this disclosure provides a method, wherein the method comprises transmitting, by a network device, according to a network protocol a packet to a further network device, and receiving, by the network device, a loopback reply packet comprising, in a payload, at least a portion of the packet including at least one header of the packet. The packet comprises loopback request information in a header of a layer of a network model. The loopback request information requests the further network device to transmit the loopback reply packet to the network device.

The above description of the network device according to the first aspect is correspondingly valid for the method of the third aspect. The network device performing the method of the third aspect may be the network device of the first aspect of this disclosure. The further network device may be the network device of the second aspect of this disclosure.

The method of the third aspect and its implementation forms and optional features achieve the same advantages as the network device of the first aspect and its respective implementation forms and respective optional features.

In an implementation form of the third aspect, the packet comprises one or more extension fields in a header of layer 3 of the network model.

In an implementation form of the third aspect, the header of the layer of the network model, in which the packet comprises the loopback request information, is a header of an intermediate layer between layer 3 and layer 4 of the network model.

In an implementation form of the third aspect, the loopback request information is or comprises one or more values of a type field of the header of the intermediate layer, the one or more values indicating a loopback request.

In an implementation form of the third aspect, the method comprises incorporating, by the network device, an identification field and/or a sequence number field in the header of the intermediate layer.

In an implementation form of the third aspect, the method comprises assigning, by the network device, a different identification field to each flow.

In an implementation form of the third aspect, the method comprises using, by the network device, the identification field and/or sequence number field to keep track of loopback requests that have been replied and/or loopback requests that need to be retransmitted.

In an implementation form of the third aspect, the header of the layer of the network model, in which the packet comprises the loopback request information, is a header of layer 3 of the network model.

In an implementation form of the third aspect, the loopback request information is or comprises an indication with regard to a loopback request.

In an implementation form of the third aspect, the header of the layer of the network model, in which the packet comprises the loopback request information, is a header of layer 5 of the network model.

In an implementation form of the third aspect, the loopback request information is or resides in a type-length-value field (TLV field).

In an implementation form of the third aspect, the method comprises obtaining, by the network device, information from the payload of the loopback reply packet.

The method according to the third aspect of this disclosure may be used in or by a server, network interface card (NIC), switch (network switch), router etc. The method according to the third aspect may be used to enhance various network protocols comprising segment routing (SR), inband network telemetry etc.

In order to achieve the method according to the third aspect of this disclosure, some or all of the implementation forms and optional features of the third aspect, as described above, may be combined with each other.

A fourth aspect of this disclosure provides a method, wherein the method comprises receiving, by a network device, according to a network protocol a packet from a further network device, and in response to the received packet comprising loopback request information in a header of a layer of a network model, transmitting, by the network device, a loopback reply packet to the further network device. The loopback reply packet comprises, in a payload, at least a portion of the received packet including at least one header of the received packet.

The above description of the network device according to the second aspect is correspondingly valid for the method of the fourth aspect. The network device performing the method of the fourth aspect may be the network device of the second aspect of this disclosure. The further network device may be the network device of the first aspect of this disclosure.

The method of the fourth aspect and its implementation forms and optional features achieve the same advantages as the network device of the first aspect and its respective implementation forms and respective optional features and as the network device of the second aspect and its respective implementation forms and respective optional features.

In an implementation form of the fourth aspect, the loopback reply packet comprises, in the payload, the entire received packet or a portion of the received packet including the at least one header of the received packet.

In an implementation form of the fourth aspect, the loopback reply packet comprises, in the payload, a header of layer 3 of the network model of the received packet as the at least one header of the received packet.

In an implementation form of the fourth aspect, in case the received packet comprises the loopback request information in a header of an intermediate layer between layer 3 and layer 4 of the network model, the loopback reply packet comprises, in the payload, the header of the intermediate layer of the received packet as the at least one header of the received packet and/or a payload of the intermediate layer of the received packet.

In an implementation form of the fourth aspect, in case the received packet comprises the loopback request information in a header of layer 3 of the network model, the loopback reply packet comprises, in the payload, a payload of layer 4 of the network model of the received packet.

In an implementation form of the fourth aspect, in case the received packet comprises the loopback request information in a header of layer 5 of the network model, the loopback reply packet comprises, in the payload, the header of layer 5 of the network model of the received packet as the at least one header of the received packet.

In an implementation form of the fourth aspect, the loopback reply packet comprises a loopback reply indication in a header of an intermediate layer between layer 3 and layer 4 of the network model.

In an implementation form of the fourth aspect, in case a header of layer 3 of the network model of the received packet comprises one or more extension fields, the method comprises skipping, by the network device, at least one of the one or more extension fields when parsing the received packet.

The method according to the fourth aspect of this disclosure may be used in or by a server, network interface card (NIC), switch (network switch), router etc. The method according to the fourth aspect may be used to enhance various network protocols comprising segment routing (SR), inband network telemetry etc.

In order to achieve the method according to the fourth aspect of this disclosure, some or all of the implementation forms and optional features of the fourth aspect, as described above, may be combined with each other.

It has to be noted that all devices, elements, units and means described in the present application could be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which

FIG. 7 shows an example of a format of a packet and a loopback reply packet according to an embodiment of this disclosure.

In the Figures, corresponding elements are labeled with the same reference sign.

DETAILED DESCRIPTION OF EMBODIMENTS

Figure 1:
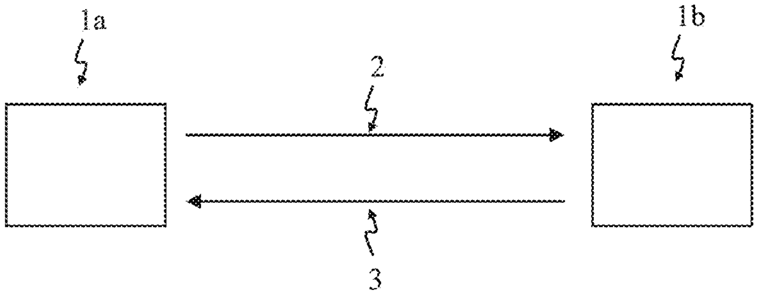
FIG. 1 shows two examples of a network device according to an embodiment of this disclosure.
Figure 1:
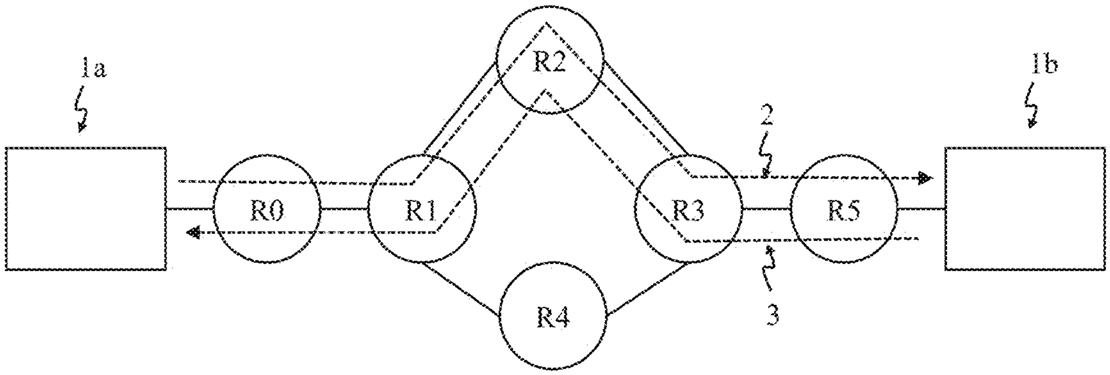

FIG. 1 shows two examples of a network device according to an embodiment of this disclosure. The network device 1*a* on the left side of FIGS. 1 (A) and (B) is an example of the network device according to the first aspect of this disclosure. The description of the network device according to the first aspect of this disclosure is correspondingly valid for the network device 1*a* on the left side of FIG. 1. The network device 1*b* on the right side of FIGS. 1 (A) and (B) is an example of the network device according to the second aspect of this disclosure. The description of the network device according to the second aspect of this disclosure is correspondingly valid for the network device 1*b* on the right side of FIG. 1.

As shown in FIG. 1 (A), the network device 1*a* (may be referred to as first network device) is configured to transmit, according to a network protocol, a packet 2 to a further network device 1*b* (may be referred to as second network device), and receive a loopback reply packet 3 comprising, in a payload, at least a portion of the packet 2 including at least one header of the packet 2. The packet 2 comprises loopback request information in a header of a layer of a network model. The loopback request information requests the further network device 1*b* to transmit the loopback reply packet 3 to the network device 1*a*.

The second network device 1*b* is configured to receive, according to the network protocol, the packet 2 from the first network device 1*a* (i.e. from a further network device), and transmit, in response to the received packet 2 comprising loopback request information in a header of a layer of a network model, the loopback reply packet 3 to the first network device 1*a*. The loopback reply packet comprises, in a payload, at least a portion of the received packet 2 including at least one header of the received packet 2.

The network protocol may be the internet protocol (IP). For example, the network protocol may be IPv4 or IPv6. The first network device 1*a* may be referred to as a source or source network device with regard to transmitting the packet 2. The second network device 1*b* may be referred to as a destination or destination network device with regard to transmitting the packet 2. The first network device 1*a* and the second network device 1*b* may be referred to as network nodes.

The first network device 1*a* and the second network device 1*b* each may be implemented by software and/or hardware. The first network device 1*a* and/or the second network device 1*b* may comprise means for communication. The means for communication may comprise one or more antennas.

The first network device 1*a* may comprise a processor or processing circuitry (not shown) configured to perform, conduct or initiate the various operations of the first network device 1*a* described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The first network device 1*a* may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the first network device 1*a* to be performed. In one embodiment, the processing circuitry comprises one or more processors and a non-transitory memory connected to the one or more processors. The non-transitory memory may carry executable program code which, when executed by the one or more processors, causes the first network device 1*a* to perform, conduct or initiate the operations or methods described herein.

The second network device 1*b* may comprise a processor or processing circuitry (not shown) configured to perform, conduct or initiate the various operations of the second network device 1*b* described herein. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The second network device 1*b* may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the second network device 1*b* to be performed. In one embodiment, the processing circuitry comprises one or more processors and a non-transitory memory connected to the one or more processors. The non-transitory memory may carry executable program code which, when executed by the one or more processors, causes the second network device 1*b* to perform, conduct or initiate the operations or methods described herein.

As exemplarily shown in FIG. 1 (B), the first network device 1*a* may be configured to transmit, according to the network protocol, the packet 2 to the second network device 1*b* via one or more intermediate network devices R0, R1, R2, R3, R4 and R5. The number of intermediate network devices between the two network devices 1*a* and 1*b* shown in FIG. 1 (B) is only by way of example and may be differently. The path from the first network device 1*a* to the second network device 1*b* for transmitting the packet 2 is only by way of example and may be differently. The one or more intermediate network devices R0, R1, R2, R3, R4 and R5 may be one or more routers. Accordingly, the second network device 1*b* may be configured to receive, according to the network protocol, the packet 2 from the first network device 1*a* via one or more intermediate network devices R0, R1, R2, R3, R4 and R5. The second network device 1*b* may be configured to transmit, in response to the received packet 2 comprising loopback request information in a header of a layer of a network model, the loopback reply packet 3 to the first network device 1*a* via one or more intermediate network devices R0, R1, R2, R3, R4 and R5. The path from the second network device 1*b* to the first network device 1*b* for transmitting the loopback reply packet 3 is only by way of example and may be differently. The two network devices 1*a* and 1*b* and the one or more intermediate network devices R0, R1, R2, R3, R4 and R5 may be network nodes of a network.

Figure 2:
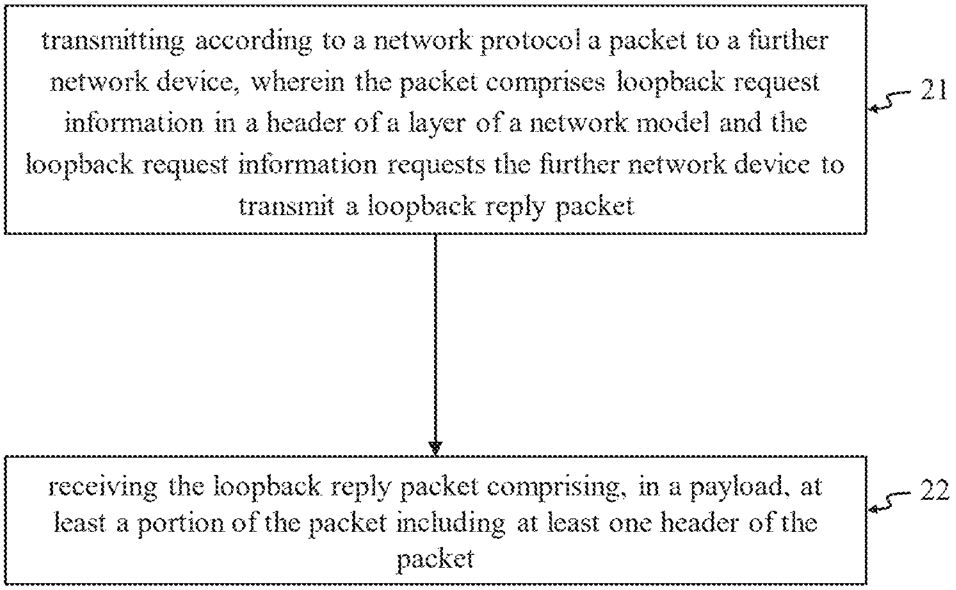
FIGS. 2 and 3 each show an example of a method according to an embodiment of this disclosure.
Figure 3:
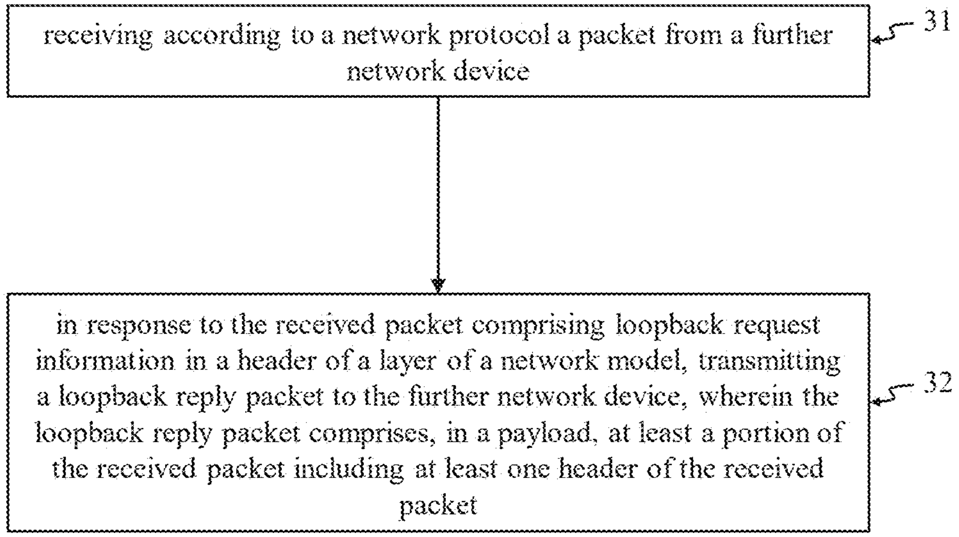

FIGS. 2 and 3 each show an example of a method according to an embodiment of this disclosure. The method of FIG. 2 is an example of the method according to the third aspect of this disclosure. The description of the method according to the third aspect of this disclosure is correspondingly valid for the method of FIG. 2. The method of FIG. 3 is an example of the method according to the fourth aspect of this disclosure. The description of the method according to the fourth aspect of this disclosure is correspondingly valid for the method of FIG. 3. The network device 1*a* and/or the network device 1*b* of FIG. 1 may be configured to perform the method of FIG. 2 and/or the method of FIG. 3.

The method of FIG. 2 comprises in a first step 21 transmitting (by a network device), according to a network protocol, a packet to a further network device. The method comprises in a second step 22 following the first step 21 receiving (by the network device) a loopback reply packet comprising, in a payload, at least a portion of the packet including at least one header of the packet. The packet comprises loopback request information in a header of a layer of a network model. The loopback request information requests the further network device to transmit the loopback reply packet to the network device.

The method of FIG. 3 comprises in a first step 31 receiving (by a network device), according to a network protocol, a packet from a further network device. The method comprises in a second step 32 following the first step 31, in response to the received packet comprising loopback request information in a header of a layer of a network model, transmitting (by the network device) a loopback reply packet to the further network device. The loopback reply packet comprises, in a payload, at least a portion of the received packet including at least one header of the received packet.

Figure 4:
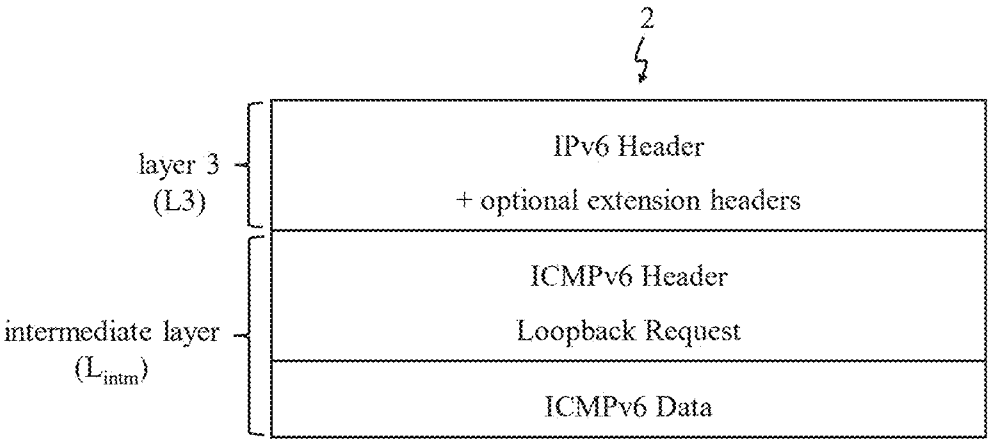
FIGS. 4 to 6 each show an example of a packet and a loopback reply packet according to an embodiment of this disclosure.
Figure 4:
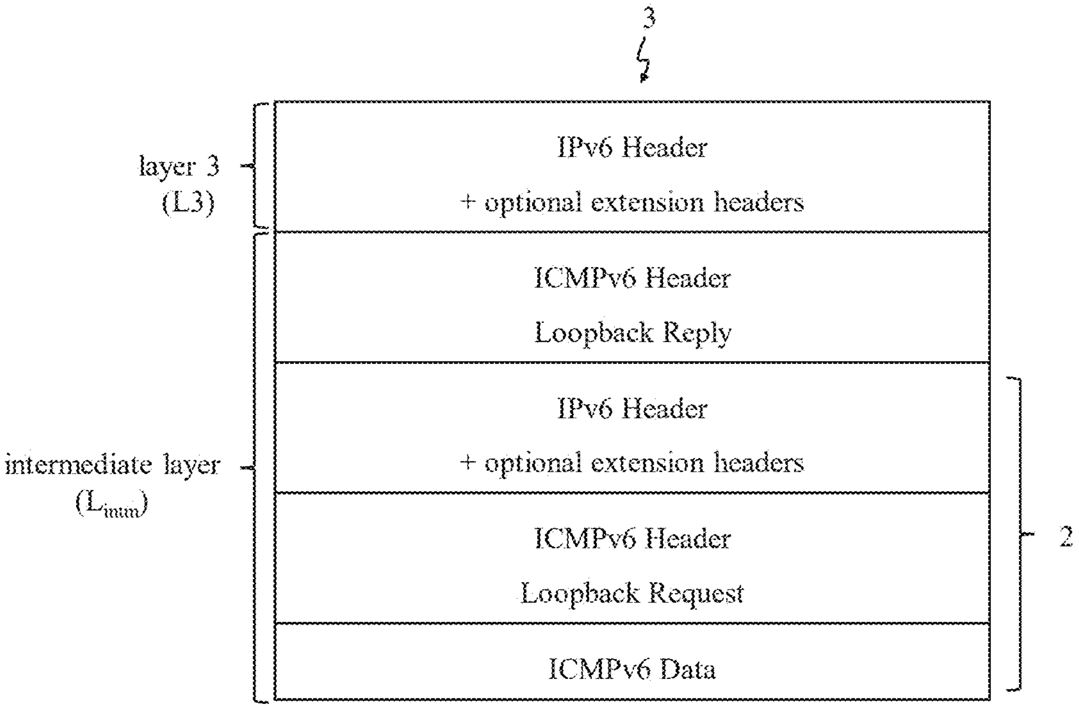
Figure 5:
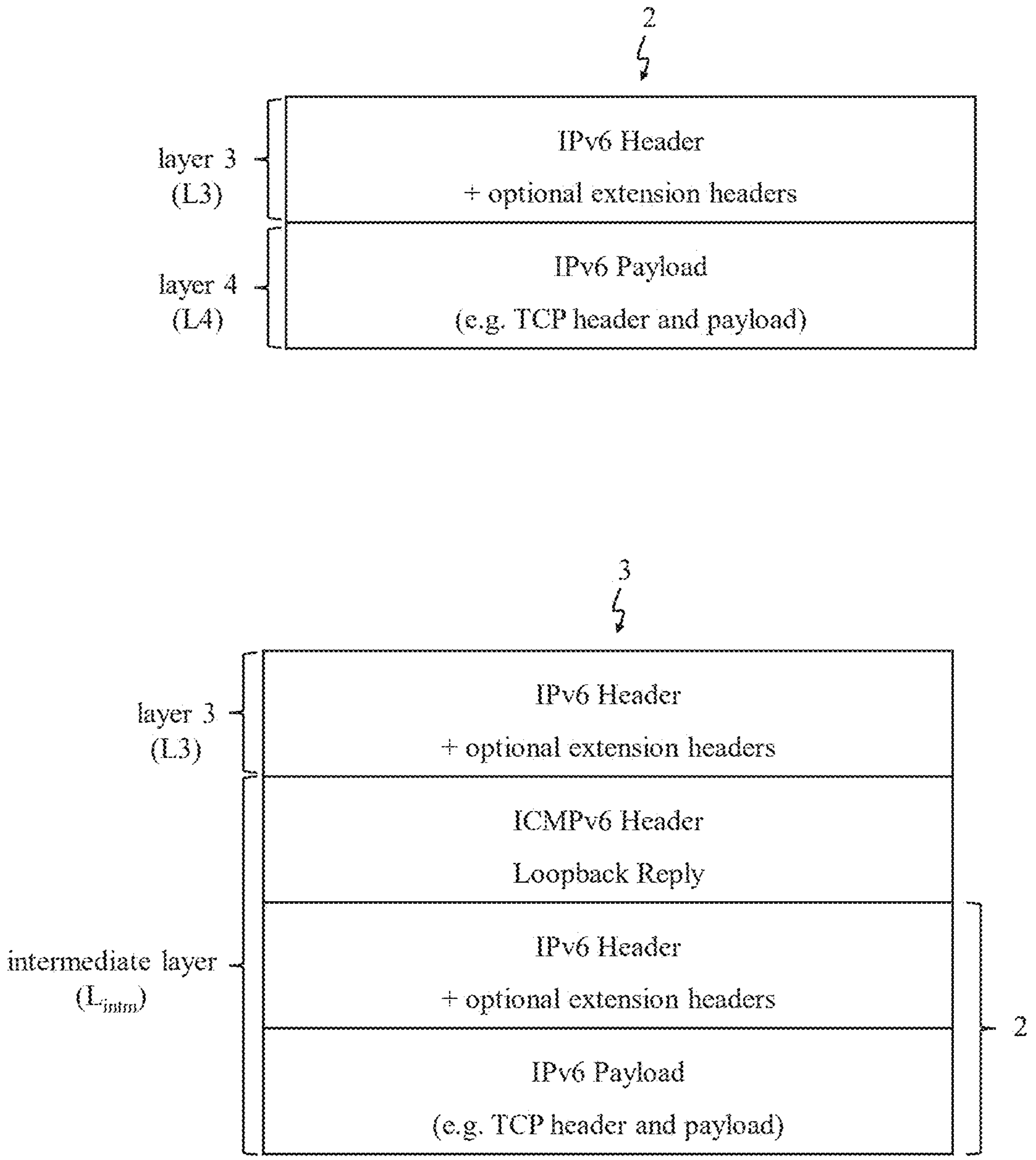
Figure 6:
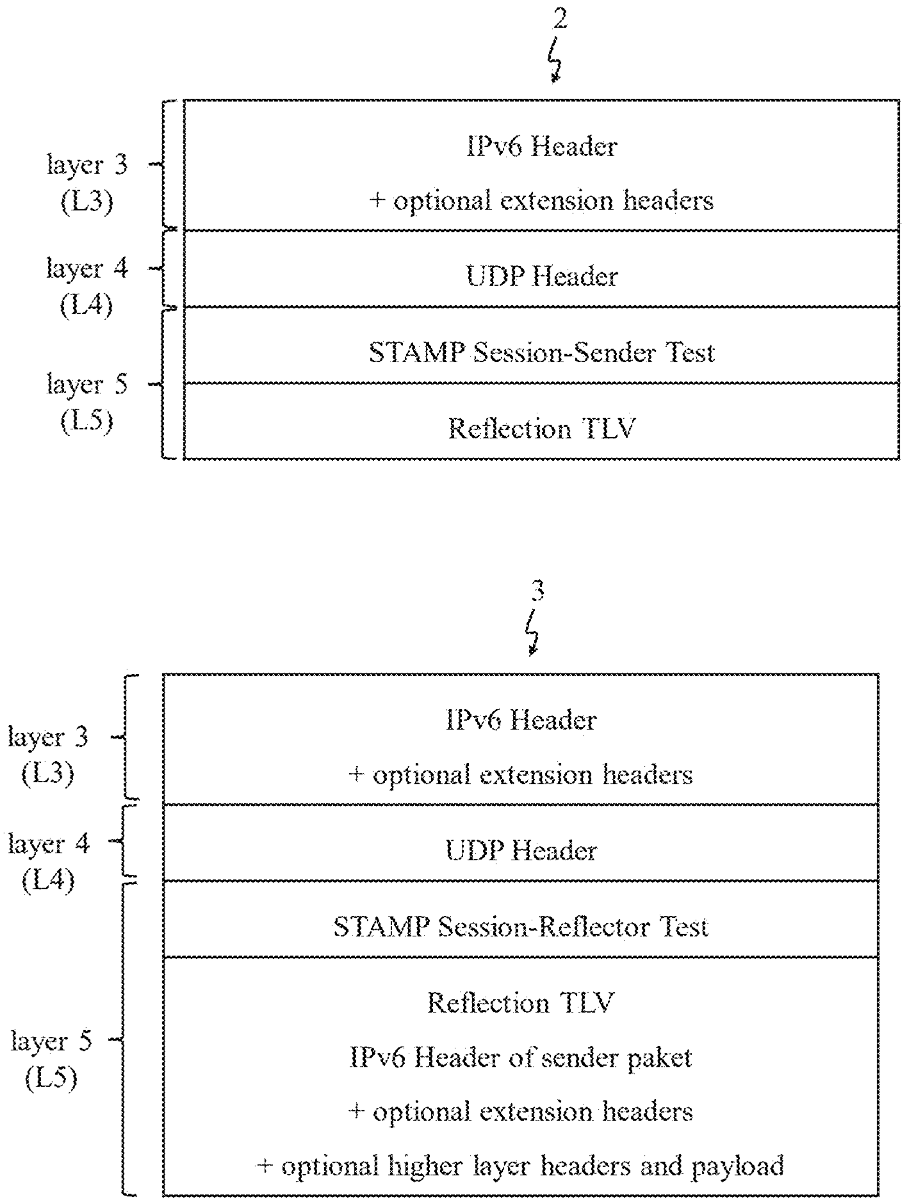

FIGS. 4 to 6 each show an example of a packet and a loopback reply packet according to an embodiment of this disclosure. FIGS. 4 to 6 each show an example of the contents of the packet and the loopback reply packet. The packets of FIGS. 4 to 6 may be examples of the packet of FIG. 1. The loopback reply packets of FIGS. 4 to 6 may be examples of the loopback reply packet of FIG. 1. In the following description reference is made to the first network device 1*a* and the second network device 1*b* of FIG. 1. FIGS. 4 to 6 are mainly described for a case in which the network protocol is IPv6. This is only by way of example and not limiting this disclosure. Thus, the description of FIGS. 4 to 6 is correspondingly valid in case of another network protocol, such as IPv4.

According to an example, the first network device 1*a* may transmit, according to a network protocol (i.e. over a network protocol), the packet 2 in the form of a loopback request packet to the second network device 1*b*. The first network device 1*a* may generate the packet 2. Optionally, the aforementioned transmission of the packet 2 may be via one or more intermediate network devices, as exemplarily indicated in FIG. 1 (B). The first network device 1*a* may be referred to as source, transmitter or sender. The second network device 1*b* may be referred to as responder.

The packet 2 may comprise no extension fields or alternatively one or more extension fields. The loopback request information of the packet 2 may reside after the optional one or more extension fields. For example, the loopback request information may be a message type of ICMPv6, or the loopback request information may be implemented as a STAMP session-sender test packet with an optional TLV that is used for requesting the loopback. The one or more optional intermediate network devices (e.g. one or more routers) may update the optional one or more extension fields. This update by a respective intermediate network device may include information on the respective intermediate network device's state and/or performance (such as timestamp(s) or counter(s)). In addition or alternatively, this update by a respective intermediate network device may include information on the respective intermediate network device's identity, and/or on its routing decision.

The second network device 1*b* may receive the packet 2 comprising the loopback request information. The second network device 1*b* may detect the loopback request information of the received packet 2. That is, the second network device 1*b* may detect or determine that the received packet 2 is or comprises a loopback request. The second network device 1*b* may skip one or more, optionally all, of the optional one or more extension fields of the received packet 2 in its parsing procedure (when the second network device 1*b* parses the received packet 2).

The second network device 1*b* does not need to be familiar with (or does not need to know) the structure of the optional one or more extension fields of the received packet 2. The second network device 1*b* may generate the loopback reply packet 3 that comprises, in a payload, at least a portion of the received packet 2 including at least one header of the received packet 2. In other words, the loopback reply packet 3 may comprise, in the payload, the received packet 2 (i.e. the loopback request packet) or a truncated portion of the received packet 2. The second network device 1*b* may transmit the loopback reply packet 3 to the first network device 1*a* (due to the received packet 2 comprising the loopback request information in a header of a layer of a network model).

The first network device 1*a* may receive the loopback reply packet 3 from the second network device 1*b*. The first network device 1*a* may retrieve/obtain and use the information from the optional one or more extension fields of the loopback request packet 3, which reside in the payload of the loopback reply packet 3.

FIG. 4 shows an example of the packet 2 and the loopback reply packet 3 according to the aforementioned described example of the first network device 1*a* requesting, using the packet 2, the loopback reply packet 3 from the second network device 1*b*.

As shown in FIG. 4, the packet 2 may comprise one or more optional extension fields in a header of layer 3 of the network model. In other words, the header of layer 3 of the network model of the packet 2 may comprise the IP header (e.g. IPv6 header) and optionally one or more extension fields (e.g. one or more IPv6 extension headers).

The one or more extension fields of the packet 2 may be updatable by one or more intermediate network devices that may be present in the flow from the first network device 1*a* being the source to the second network device 1*b* being the destination. The update, by the one or more intermediate network devices, of the optional one or more extension fields in the header of layer 3 may comprise information on at least one of the following: the respective intermediate device's state and/or performance (e.g. timestamps or counters); identity of the respective intermediate network device; and routing decision of the respective intermediate network device. Further, as shown in FIG. 4, the header of the layer of the network model, in which the packet 2 comprises the loopback request information, may be a header of an intermediate layer $L_{intm}$ between layer 3 and layer 4 of the network model. For example, the intermediate layer $L_{intm}$ may be ICMPv6 and, thus, the header of the intermediate layer $L_{intm}$ may be the ICMPv6 header comprising the loopback request information. The packet 2 may comprise a payload of the intermediate layer $L_{intm}$. For example, the packet 2 may comprise ICMPv6 data (e.g. ICMPv6 payload), as shown in FIG. 4.

As shown in FIG. 4, the loopback reply packet 3 may comprise one or more optional extension fields in a header of layer 3 of the network model. In other words, the header of layer 3 of the network model of the loopback reply packet 3 may comprise the IP header (e.g. IPv6 header) and optionally one or more extension fields (e.g. one or more IPv6 extension headers). As shown in FIG. 4, the loopback reply packet 3 may comprise a loopback reply indication in a header of the intermediate layer $L_{intm}$ between layer 3 and layer 4 of the network model. For example, the intermediate layer $L_{intm}$ may be ICMPv6 and, thus, the header of the intermediate layer $L_{intm}$ of the loopback reply packet 3 may be the ICMPv6 header comprising the loopback reply indication.

As shown in FIG. 4, the loopback reply packet 3 may comprise, in the payload, the entire received packet 2. For example, the loopback reply packet 3 may comprise, in the payload, the header of layer 3 of the network model of the packet 2 comprising the IP header (e.g. IPv6 header) and optionally one or more extension fields (e.g. one or more IPv6 extension headers); the header of the intermediate layer $L_{intm}$ of the network model of the received packet 2 (e.g. ICMPv6 header) comprising the loopback request information; and the payload of the intermediate layer $L_{intm}$ of the received packet 2 (e.g. ICMPv6 data). Alternatively, the loopback reply packet 3 may comprise only a portion of the received packet 2 including the header of the intermediate layer $L_{intm}$ of the network model of the received packet 2 (e.g. ICMPv6 header) as the at least one header of the received packet 2.

In the aforementioned described example of the first network device 1*a* requesting, using the packet 2, the loopback reply packet 3 from the second network device 1*b*, the first network device 1*a* may optionally incorporate an identification field and/or a sequence number field (for example, as in ICMPv6) into the packet 2 (i.e. the loopback request packet). The second network device 1*b* may copy this field or these fields to the loopback reply packet 3, i.e. to the payload of the loopback reply packet 3.

Optionally, the first network device 1*a* may assign a different identification field to each flow. For example, a flow may be defined as a pair of a source and destination (e.g. {source address, destination address} pair) of communication, i.e. as a pair of a source network device (e.g. the first network device 1*a*) and a destination network device (e.g. the second network device 1*b*). For this, the address of the source and the destination may optionally be used. For example, a flow may be defined as a tuple of a source, destination and segment routing (SR) policy (e.g. {source address, destination address, SR policy} tuple). For this, the address of the source and the destination and a SR policy may be used. The SR policy may explicitly define a path from the source to the destination, and use a segment routing header (SRH) to route through this path. The path may be via one or more intermediate network devices (e.g. routers).

The first network device 1*a* may use the identification field and/or the sequence number field to keep track of loopback requests that have been replied and/or loopback requests that need to be retransmitted.

According to a further example, in addition or alternatively to the above described example, the first network device 1*a* may piggyback the loopback request information onto the packet 2 being a data packet. In other words, the packet 2 may be a data packet and the first network device 1*a* may piggyback the loopback request information onto the data packet. The first network device 1*a* may piggyback the loopback request information onto the packet 2 (being a data packet) using an indication in the data packet's header. Thus, the header of the layer of the network model, in which the packet 2 comprises the loopback request information, may be a header of layer 3 of the network model.

The loopback request information (e.g. the indication) may be in the IP header. In addition or alternatively, the loopback request information may be in or may be at least one of the optional one or more extension fields of the header of layer 3. For example, the loopback request information of the packet 2 may be or may comprise a reserved value (or a range of values) in a differentiated services code point (DSCP) field, which indicate(s) that the packet 2 is subject to a loopback request (i.e. comprises a loopback request). The loopback request information (e.g. the indication) may be or may comprise, for example, a specific option in one of the one or more optional extension fields (e.g. IPv6 extension fields) that instructs the destination (i.e. the second network device 1*b*) to respond (by transmitting the loopback reply packet 3) to the loopback request of the packet 2.

The second network device 1*b*, upon detecting the loopback request information of the header of layer 3 of the network model of the received packet 2 (received from the first network device 1*a*) may forward the packet 2 (being a data packet) to an application layer. The second network device 1*b* may generate the loopback reply packet 3 that may comprise in the payload the received data packet 2 (and its header). Optionally, the second network device 1*b* may truncate the received data packet 2, in order to prevent the loopback reply packet 3 from exceeding a network's maximum transfer unit (MTU). That is, the loopback reply packet 3 comprises, in a payload, at least a portion of the received packet 2 including at least one header of the received packet 2. According to the further example, the loopback reply packet comprises, in the payload, a header of layer 3 of the network model of the received packet 2 as the at least one header of the received packet 2.

FIG. 5 shows an example of the packet 2 and the loopback reply packet 3 according to aforementioned described further example of the first network device 1*a* requesting, using the packet 2, the loopback reply packet 3 from the second network device 1*b*. The description of FIG. 4 may be correspondingly valid for the packet 2 and loopback reply packet 3 of FIG. 5.

As shown in FIG. 5, the packet 2 may comprise one or more optional extension fields in a header of layer 3 of the network model. In other words, the header of layer 3 of the network model of the packet 2 may comprise the IP header (e.g. IPv6 header) and optionally one or more extension fields (e.g. one or more IPv6 extension headers).

The one or more extension fields of the packet 2 may be updatable by one or more intermediate network devices that may be present in the flow from the first network device 1*a* being the source to the second network device 1*b* being the destination. The update, by the one or more intermediate network devices, of the optional one or more extension fields in the header of layer 3 may comprise information on at least one of the following: the respective intermediate device's state and/or performance (e.g. timestamps or counters); identity of the respective intermediate network device; and routing decision of the respective intermediate network device. According to the example of FIG. 5, the header of the layer of the network model, in which the packet 2 comprises the loopback request information, is the header of layer 3 of the network model. The loopback request information may be in the IP header (e.g. IPv6 header). In addition or alternatively, the loopback request information may be in or may be at least one of the optional one or more extension fields of the header of layer 3 (e.g. one or more IPv6 extension headers). As shown in FIG. 5, the packet 2 may comprise a payload of the network protocol. For example, the packet 2 may comprise an IPv6 payload (e.g. a TCP header and payload).

As shown in FIG. 5, the loopback reply packet 3 may comprise one or more optional extension fields in a header of layer 3 of the network model. In other words, the header of layer 3 of the network model of the loopback reply packet 3 may comprise the IP header (e.g. IPv6 header) and optionally one or more extension fields (e.g. one or more IPv6 extension headers). As shown in FIG. 5, the loopback reply packet 3 may comprise a loopback reply indication in a header of the intermediate layer $L_{intm}$ between layer 3 and layer 4 of the network model. For example, the intermediate layer $L_{intm}$ may be ICMPv6 and, thus, the header of the intermediate layer $L_{intm}$ of the loopback reply packet 3 may be the ICMPv6 header comprising the loopback reply indication.

As shown in FIG. 5, the loopback reply packet 3 may comprise, in the payload, the entire received packet 2. For example, the loopback reply packet 3 may comprise, in the payload, the header of layer 3 of the network model of the packet 2 comprising the IP header (e.g. IPv6 header) and optionally one or more extension fields (e.g. one or more IPv6 extension headers); and the payload of the network protocol of the packet 2, such as the IPv6 payload (e.g. a TCP header and payload). Alternatively, the loopback reply packet 3 may comprise only a portion of the received packet 2 including the header of layer 3 of the network model of the packet 2 as the at least one header of the received packet 2.

According to a furthermore example, in addition or alternatively to the above described example and/or above described further example, the first network device 1*a* may transmit the packet 2 that comprises the loopback request information in a header of layer 5 of the network model. The loopback request information may be or may reside in a type-length-value field (TLV field). The header of layer 5 may be a simple two-way active measurement protocol (STAMP) header. The TLV may be a STAMP header extension. In other words, the first network device 1*a* may transmit a STAMP test packet to the second network device 1*b*, which may comprise a "reflection TLV" or "loopback request TLV". This TLV may indicate to the second network device 1*b* the loopback request. On the forward direction (i.e. transmitting the packet 2 from the first network device 1*a* to the second network device 1*b*) the TLV (e.g. reflection TLV) may be used to indicate that the first network device 1*a* requests the loopback reply packet 3 from the second network device 1*b*. On the reverse direction (i.e. transmitting the loopback reply packet 3 from the second network device 1*b* to the first network device 1*a*) the TLV (e.g. reflection TLV) may include the packet 2 received by the second network device 1*b* (or a truncated version of it) in the payload of the loopback reply packet 3.

FIG. 6 shows an example of the packet 2 and the loopback reply packet 3 according to aforementioned described furthermore example of the first network device 1*a* requesting, using the packet 2, the loopback reply packet 3 from the second network device 1*b*. The description of FIGS. 4 and 5 may be correspondingly valid for the packet 2 and loopback reply packet 3 of FIG. 6.

As shown in FIG. 6, the packet 2 may comprise one or more optional extension fields in a header of layer 3 of the network model. In other words, the header of layer 3 of the network model of the packet 2 may comprise the IP header (e.g. IPv6 header) and optionally one or more extension fields (e.g. one or more IPv6 extension headers).

The one or more extension fields of the packet 2 may be updatable by one or more intermediate network devices that may be present in the flow from the first network device 1*a* being the source to the second network device 1*b* being the destination. The update, by the one or more intermediate network devices, of the optional one or more extension fields in the header of layer 3 may comprise information on at least one of the following: the respective intermediate device's state and/or performance (e.g. timestamps or counters); identity of the respective intermediate network device; and routing decision of the respective intermediate network device. The packet 2 may comprise a header of layer 4 of the network model (e.g. a user datagram protocol (UDP) header).

According to the example of FIG. 5, the header of the layer of the network model, in which the packet 2 comprises the loopback request information, is a header of layer 5 of the network model. The loopback request information may be or may reside in a type-length-value field (TLV field, e.g. reflection TLV). The header of layer 5 may be a simple two-way active measurement protocol (STAMP) header. The TLV may be a STAMP header extension. As indicated in FIG. 6, the loopback request information may be implemented as a STAMP session-sender test packet with an optional TLV that is used for requesting the loopback.

The loopback reply packet 3 of FIG. 5 may comprises one or more optional extension fields in a header of layer 3 of the network model. In other words, the header of layer 3 of the network model of the loopback reply packet 3 may comprise the IP header (e.g. IPv6 header) and optionally one or more extension fields (e.g. one or more IPv6 extension headers). The loopback reply packet 3 may comprise a header of layer 4 of the network model (e.g. a user datagram protocol (UDP) header).

As shown in FIG. 6, the loopback reply packet 3 may be implemented as a STAMP session-reflector test packet. As indicated in FIG. 6, the loopback reply packet 3 may comprise, in the payload, the entire received packet 2. For example, the loopback reply packet 3 may comprise, in the payload, the header of layer 3 of the network model of the packet 2 comprising the IP header (e.g. IPv6 header) and optionally one or more extension fields (e.g. one or more IPv6 extension headers); the TLV field (e.g. reflection TLV) of the received packet 2 and optionally one or more higher layer headers and payload. Alternatively, the loopback reply packet 3 may comprise, in the payload, only a portion of the received packet 2 including the header of layer 5 of the network model of the received packet 2 as the at least one header of the received packet 2.

FIG. 7 shows an example of a format of a packet and a loopback reply packet according to an embodiment of this disclosure. The packet of FIG. 7 may be an example of the packet of FIG. 1. The loopback reply packet of FIG. 7 may be an example of the loopback reply packet of FIG. 1.

The example of FIG. 7 corresponds to the example of FIG. 4. In other words, the header of the layer of the network model, in which the packet 2 of FIG. 7 comprises the loopback request information, is a header of an intermediate layer $L_{intm}$ between layer 3 and layer 4 of the network model. The loopback request information may be or may comprise one or more values of a type field ("Type" shown in FIG. 7) of the header of the intermediate layer $L_{intm}$, wherein the one or more values indicate a loopback request. The type field may be the type field of an ICMP header or ICMPv6 header. A code field of the header of the intermediate layer $L_{intm}$ may be constant (e.g. zero) and unused. The code field ("Code" shown in FIG. 7) may be the code field of an ICMP header or ICMPv6 header.

According to FIG. 7, the loopback reply packet 3 may comprise a loopback reply indication in a header of the intermediate layer $L_{intm}$ between layer 3 and layer 4 of the network model. The loopback reply indication may be or may comprise one or more values of a type field ("Type" shown in FIG. 7) of the header of the intermediate layer $L_{intm}$ of the loopback reply packet 3, wherein the one or more values indicate a loopback reply. The type field may be the type field of an ICMP header or ICMPv6 header. A code field of the header of the intermediate layer $L_{intm}$ of the loopback reply packet 3 may be constant (e.g. zero) and unused. The code field ("Code" shown in FIG. 7) may be the code field of an ICMP header or ICMPv6 header. The payload of the loopback reply packet 3 may comprise the received packet 2 (i.e. loopback request packet) or a portion of the received packet 2 including at least the header of layer 3 of the network model of the received packet 2. That is, the payload of the loopback reply packet 3 may comprise at least the IP header (e.g. IPv6 header) and optionally one or more extension fields (e.g. one or more IPv6 extension headers) of the received packet 2.

The identifier ("Identifier" shown in FIG. 7) and sequence number ("Sequence Number" shown in FIG. 7) of the loopback reply packet 3 may be copied from the packet 2 (i.e. the loopback request packet).

With regard to the description of the Figures, the layers of the network model, such as layer 3, the intermediate layer $L_{intm}$ between layer 3 and layer, layer 4 and layer 5, may be layers of the TCP/IP five layer network model. In the Figures, a header of layer 2 of the network model (e.g. Ethernet header) is not shown.

As shown above, the loopback request information may reside in one of the protocol headers (i.e. a header of a layer of the network model), or an extension of one of the protocol headers. For example, as shown in FIG. 4, the header of the layer of the network model, in which the packet 2 comprises the loopback request information, may be a header of an intermediate layer between layer 3 and layer 4 of the network model. For example, the header of the intermediate layer may be an ICMP header or ICMPv6 header. For example, the loopback request information may be comprised in the ICMP header or ICMPv6 header using the type field (cf. FIG. 7). According to a further example, as shown in FIG. 5, the header of the layer of the network model, in which the packet 2 comprises the loopback request information, may be a header of layer 3 of the network model. For example, the loopback request information may reside in the IP header (e.g. IPv6 header or IPv4 header) and/or in at least one of one or more optional extension fields (e.g. one or more IPv6 extension headers or one or more IPv4 extension options). According to a furthermore example, as shown in FIG. 6, the header of the layer of the network model, in which the packet 2 comprises the loopback request information, may be a header of layer 5 of the network model. For example, the loopback request information may be or may reside in a type-length-value field, TLV field. The header of layer 5 may be a simple two-way active measurement protocol (STAMP) header. The TLV may be a STAMP header extension.

The present disclosure has been described in conjunction with various embodiments as examples as well as implementations. However, other variations can be understood and effected by those persons skilled in the art and practicing the claimed matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A first network device, comprising:

one or more processors; and a non-transitory computer readable medium storing a program to be executed by the one or more processors, wherein the program comprises instructions that when executed by the one or more processors, cause the first network device to perform operations comprising:

transmitting, according to a network protocol, a data packet to a second network device, wherein the data packet comprises loopback request information in a header of a layer of a network model, and the network model includes a Transmission Control Protocol/Internet Protocol (TCP/IP) model; and receiving a loopback reply packet comprising, in a payload, at least a portion of the data packet including at least one header of the data packet, wherein the loopback request information requests the second network device to transmit the loopback reply packet to the first network device.

2. The first network device according to claim 1, wherein:

the data packet comprises one or more extension fields in a header of layer 3 (L3) of the network model.

3. The first network device according to claim 1, wherein:

the header of the layer of the network model, in which the data packet comprises the loopback request information, is a header of an intermediate layer ($L_{intm}$) between layer 3 (L3) and layer 4 (L4) of the network model.

4. The first network device according to claim 3, wherein:

the loopback request information is or comprises one or more values of a type field of the header of the $L_{intm}$, the one or more values indicating a loopback request.

5. The first network device according to claim 3, wherein the operations comprise:

incorporating at least one of an identification field or a sequence number field in the header of the $L_{intm}$.

6. The first network device according to claim 5, wherein the operations comprise:

assigning a different identification field to each flow.

7. The first network device according to claim 5, wherein the operations comprise:

using at least one of the identification field or the sequence number field to keep track of at least one of loopback requests that have been replied or loopback requests that need to be retransmitted.

8. The first network device according to claim 1, wherein:

the header of the layer of the network model, in which the data packet comprises the loopback request information, is a header of layer 3 (L3) of the network model.

9. The first network device according to claim 8, wherein:

the loopback request information is or comprises an indication associated with a loopback request.

10. The first network device according to claim 1, wherein:

the header of the layer of the network model, in which the data packet comprises the loopback request information, is a header of layer 5 (L5) of the network model.

11. The first network device according to claim 10, wherein:

the loopback request information is or resides in a type-length-value (TLV) field.

12. A first network device, comprising:

one or more processors; and a non-transitory computer readable medium storing a program to be executed by the one or more processors, wherein the program comprises instructions that when executed by the one or more processors, cause the first network device to perform operations comprising:

receiving, according to a network protocol, a data packet from a second network device; and transmitting, in response to the received packet comprising loopback request information in a header of a layer of a network model, a loopback reply packet to the second network device, wherein the loopback reply packet comprises, in a payload, at least a portion of the received packet including at least one header of the received packet, and the network model includes a Transmission Control Protocol/Internet Protocol (TCP/IP) model.

13. The first network device according to claim 12, wherein:

the loopback reply packet comprises, in the payload, the entire received packet; or the loopback reply packet comprises, in the payload, a portion of the received packet, the portion of the received packet including the at least one header of the received packet.

14. The first network device according to claim 12, wherein:

the loopback reply packet comprises, in the payload, a header of layer 3 (L3) of the network model of the received packet as the at least one header of the received packet.

15. The first network device according to claim 12, wherein:

when the received packet comprises the loopback request information in a header of an intermediate layer ($L_{intm}$) between layer 3 (L3) and layer 4 (L4) of the network model, the loopback reply packet comprises, in the payload, at least one of the header of the $L_{intm}$ of the received packet as the at least one header of the received packet or a payload of the $L_{intm}$ of the received packet.

16. The first network device according to claim 12, wherein:

when the received packet comprises the loopback request information in a header of layer 3 (L3) of the network model, the loopback reply packet comprises, in the payload, a payload of layer 4 (L4) of the network model of the received packet.

17. The first network device according to claim 12, wherein:

when the received packet comprises the loopback request information in a header of layer 5 (L5) of the network model, the loopback reply packet comprises, in the payload, the header of L5 of the network model of the received packet as the at least one header of the received packet.

18. The first network device according to claim 12, wherein:

the loopback reply packet comprises a loopback reply indication in a header of an intermediate layer ($L_{intm}$) between layer 3 (L3) and layer 4 (L4) of the network model.

19. The first network device according to claim 12, wherein the operations comprise:

when a header of layer 3 (L3) of the network model of the received packet comprises one or more extension fields, skipping at least one of the one or more extension fields when parsing the received packet.

20. A method, comprising:

transmitting, by a first network device, according to a network protocol, a data packet to a second network device, wherein the data packet comprises loopback request information in a header of a layer of a network model, and the network model includes a Transmission Control Protocol/Internet Protocol (TCP/IP) model; and receiving, by the first network device, a loopback reply packet comprising, in a payload, at least a portion of the data packet including at least one header of the data packet, wherein the loopback request information requests the second network device to transmit the loopback reply packet to the first network device.

* * * * *